United States Patent
Nakayama et al.

(10) Patent No.: US 11,426,866 B2
(45) Date of Patent: Aug. 30, 2022

(54) ROBOT

(71) Applicant: FANUC CORPORATION, Yamanashi (JP)

(72) Inventors: Kazutaka Nakayama, Yamanashi (JP); Kenichirou Abe, Yamanashi (JP); Masahiro Morioka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/132,612

(22) Filed: Sep. 17, 2018

(65) Prior Publication Data
US 2019/0091855 A1     Mar. 28, 2019

(30) Foreign Application Priority Data
Sep. 28, 2017   (JP) .............................. JP2017-188149

(51) Int. Cl.
*B25J 18/04*   (2006.01)
*B25J 9/08*   (2006.01)
*B25J 9/00*   (2006.01)
*B25J 9/04*   (2006.01)
*B25J 17/00*   (2006.01)

(52) U.S. Cl.
CPC ............... *B25J 9/08* (2013.01); *B25J 9/0009* (2013.01); *B25J 9/042* (2013.01); *B25J 18/04* (2013.01); *B25J 17/00* (2013.01)

(58) Field of Classification Search
CPC ... B25J 18/04; B25J 9/009; B25J 9/042; B25J 18/007
See application file for complete search history.

(56) References Cited

U.S. PATENT DOCUMENTS

| | | | | |
|---|---|---|---|---|
| 4,536,690 A | * | 8/1985 | Belsterling | .......... B23Q 1/5462 318/687 |
| 4,610,598 A | * | 9/1986 | Hamada | ................... B25J 9/042 414/744.5 |
| 5,525,027 A | | 6/1996 | Jinno et al. | |

(Continued)

FOREIGN PATENT DOCUMENTS

| EP | 0 541 811 A1 | 5/1993 |
|---|---|---|
| EP | 2 497 576 A1 | 9/2012 |

(Continued)

OTHER PUBLICATIONS

"Schoolphysics," available at http://www.schoolphysics.co.uk/age11-14/Mechanics/Statics/text/Stability_/index.html. (Year: 2008).*

(Continued)

*Primary Examiner* — Randell J Krug
(74) *Attorney, Agent, or Firm* — Maier & Maier, PLLC (57) ABSTRACT

A robot that includes a base that is provided with a flat installation surface member that is disposed on an installation target surface and a columnar member that extends upward from the installation surface member; and a first arm, one end of which is supported so as to be rotatable about a first horizontal axis located above the columnar member of the base and that has a motion range below the first horizontal axis. The columnar member has a length that is equal to or longer than the length of the first arm and has a uniform transverse sectional area that is the same as the first arm.

12 Claims, 5 Drawing Sheets

(56) References Cited

U.S. PATENT DOCUMENTS

| | | | |
|---|---|---|---|
| 7,645,110 B2* | 1/2010 | Ogawa | B25J 5/007 414/547 |
| 8,442,686 B2* | 5/2013 | Saito | B25J 3/00 700/261 |
| 2007/0048118 A1 | 3/2007 | Ogawa et al. | |
| 2012/0260854 A1 | 10/2012 | Takebe et al. | |
| 2013/0041509 A1 | 2/2013 | Saito et al. | |
| 2014/0067119 A1 | 3/2014 | Gomi et al. | |
| 2016/0045177 A1* | 2/2016 | Barth | A61N 5/1083 378/198 |
| 2016/0318180 A1 | 11/2016 | Miyasaka | |
| 2017/0259436 A1 | 9/2017 | Nakayama et al. | |
| 2018/0221904 A1* | 8/2018 | Yoshino | B25J 5/02 |
| 2018/0326598 A1* | 11/2018 | Miyasaka | B25J 9/047 |
| 2019/0091854 A1 | 3/2019 | Nakayama et al. | |
| 2019/0093690 A1 | 3/2019 | Nakayama et al. | |

FOREIGN PATENT DOCUMENTS

| | | |
|---|---|---|
| JP | S62-228394 A | 10/1987 |
| JP | H04-349095 A | 12/1992 |
| JP | H06-143165 A | 5/1994 |
| JP | H06-155368 A | 6/1994 |
| JP | H07-171779 A | 7/1995 |
| JP | 2003038663 A | 2/2003 |
| JP | 2004-230509 A | 8/2004 |
| JP | 2007-061964 A | 3/2007 |
| JP | 2010-046773 A | 3/2010 |
| JP | 2011098299 A | 5/2011 |
| JP | 2011-230214 A | 11/2011 |
| JP | 2012236249 A | 12/2012 |
| JP | 2012236349 A | 12/2012 |
| JP | 2014-46404 A | 3/2014 |
| JP | 2014054727 A | 3/2014 |
| JP | 2016-203345 A | 12/2016 |
| JP | 2017-159397 A | 9/2017 |
| JP | 2019-063876 A | 4/2019 |
| JP | 2019-063878 A | 4/2019 |
| WO | 97/05421 A1 | 2/1997 |
| WO | 2012/104895 A1 | 8/2012 |

OTHER PUBLICATIONS

Robotics Technology—Arms, electronicsteacher.com. (Year: 2006).*

Office Action dated Aug. 6, 2019 in corresponding Japanese Application No. 2017-188149; 12 pages including English-language translation.

Search Report dated Jul. 17, 2019 in corresponding Japanese Application No. 2017-188149; 14 pages including English-language translation.

Japanese Office Action dated Nov. 12, 2019, in connection with corresponding JP Application No. 2017-188149 (11 pgs., including machine-generated English translation).

Japanese Office Action dated Feb. 12, 2020, in connection with corresponding JP Application No. 2017-188149 (12 pgs., including machine-generated English translation).

Japanese Office Action dated Jan. 5, 2021, in connection with corresponding JP Application No. 2020-067314 (9 pp., including machine-generated English translation).

* cited by examiner

ROBOT

CROSS-REFERENCE TO RELATED APPLICATIONS

This application is based on Japanese Patent Application No. 2017-188149, the content of which is incorporated herein by reference.

FIELD

The present invention relates to a robot.

BACKGROUND

In a workspace where a human and a robot perform cooperative work, if the robot is installed on the floor surface, the workspace is occupied by the robot, and thus, there is a disadvantage in that a large human workspace cannot be ensured. In order to eliminate this disadvantage, there is a known ceiling-suspended type robot that is not installed on the floor surface (for example, Japanese Unexamined Patent Application, Publication No. 2011-230214).

SUMMARY

The present invention provides the following solutions.

One aspect of the present invention is directed to a robot including: a base that is provided with a flat installation surface member that is installed on an installation target surface and a columnar member that extends upward from the installation surface member; and a first arm, one end of which is supported so as to be rotatable about a first horizontal axis located above the columnar member of the base and that has a motion range below the first horizontal axis, wherein the columnar member has a length that is equal to or longer than the length of the first arm and has a uniform transverse sectional area that is the same as the first arm.

DETAILED DESCRIPTION

A robot 1 according to one embodiment of the present invention will be described below with reference to the drawings.

Figure 1:
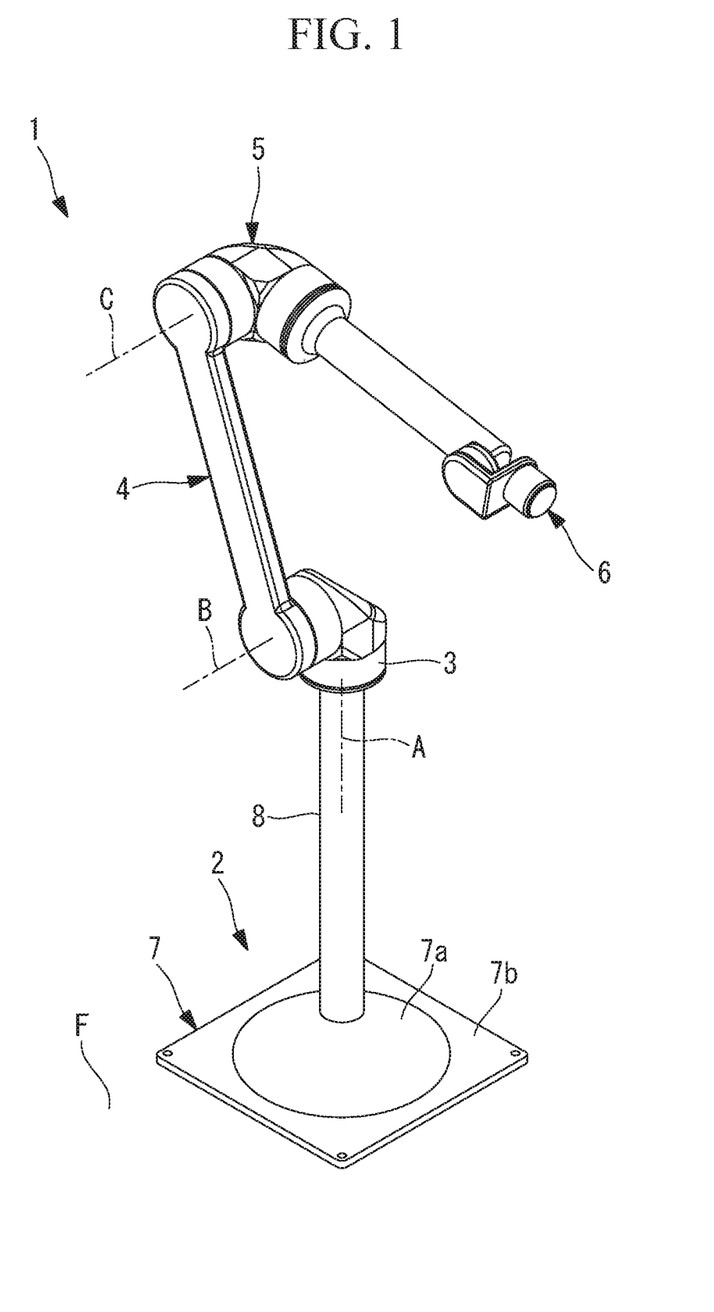
FIG. 1 is a perspective view showing a robot according to one embodiment of the present invention.
Figure 2:
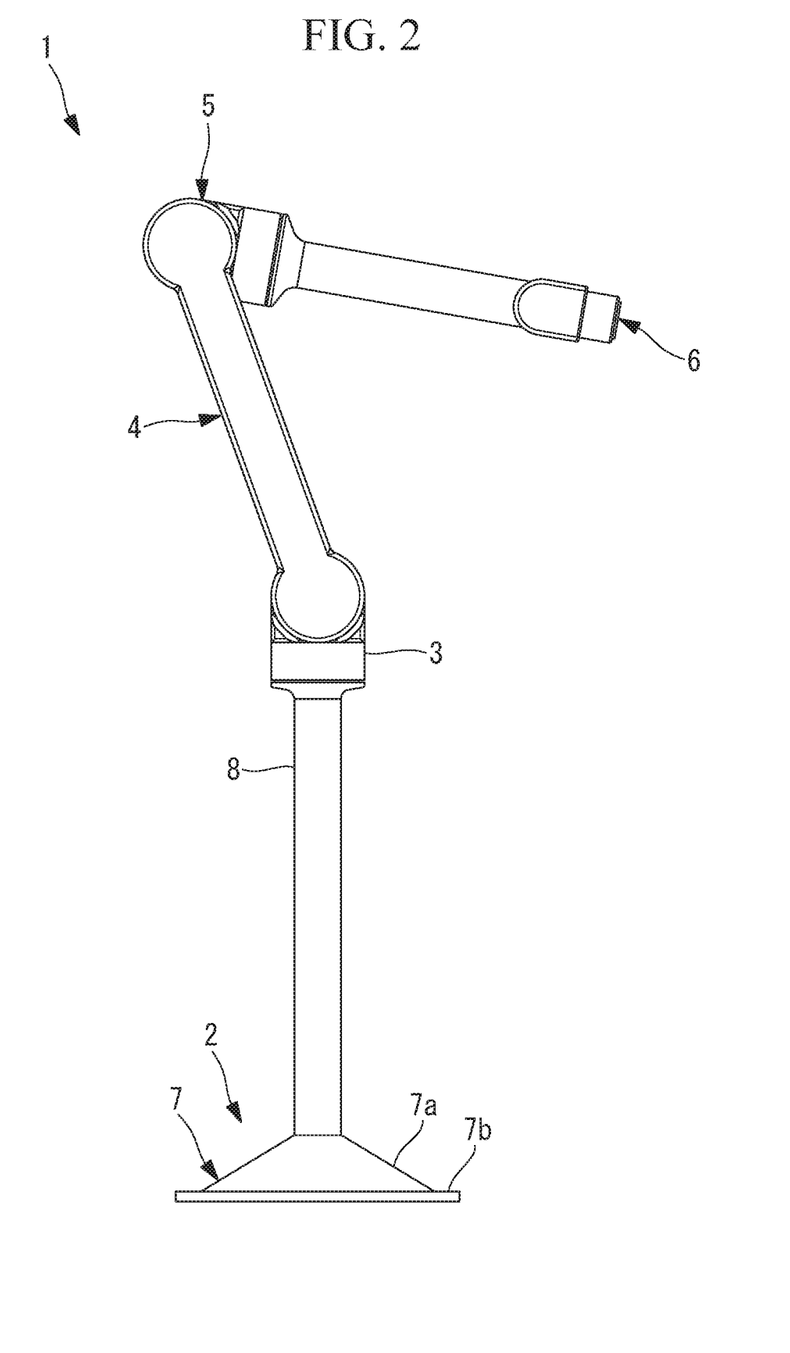
FIG. 2 is a side view of the robot shown in FIG. 1.

As shown in FIGS. 1 and 2, the robot 1 of this embodiment is a 6-axis vertical articulated robot that is provided with: a base 2 that is installed on the floor surface (installation target surface) F; a turning part 3 that is supported so as to be rotatable about a first axis (vertical axis) A that is vertical to the base 2; a first arm 4 that is supported so as to be pivotable about a second axis (first horizontal axis) B that is horizontal to the turning part 3; a second arm 5 that is supported at a distal end of the first arm 4 so as to be pivotable about a third axis (second horizontal axis) C that is parallel to the second axis B; and a 3-axis wrist 6 that is disposed at a distal end of the second arm 5.

The base 2 is provided with: a support foot member (installation surface member) 7 that is flat so as to spread along the floor surface F and that has a substantially square shape in plan view; and a column-shaped columnar member 8 that extends vertically upward from the center of the support foot member 7. The turning part 3 is supported in a rotatable manner, at an upper end of the columnar member 8.

The support foot member 7 of the base 2 is provided with: a truncated cone section 7a that extends slightly upward at the center thereof; and a flat-plate guard section 7b that extends horizontally at the outer periphery of the truncated cone section 7a. The guard section 7b is formed into a substantially square shape in plan view, and through-holes that penetrate the guard section 7b in the thickness direction are provided at the four corners. The through-holes each have an inner diameter through which an anchor bolt can be made to pass, so that the robot 1 can be fixedly installed on the floor surface F by using anchor bolts.

As shown in FIG. 1, the first arm 4 is disposed so as to be offset in one radial direction with respect to the columnar member 8 and is disposed so as to rotate in a plane disposed parallel to the longitudinal axis of the columnar member 8 with a gap therebetween. The length of the first arm 4 is set shorter than the length of the columnar member 8 of the base 2 and has a 360° motion range. Furthermore, the thickness (transverse sectional area) of the columnar member 8 is set almost the same as the thickness (transverse sectional area) of the first arm 4.

As shown in FIG. 1, the second arm 5 is disposed so as to be offset in the direction opposite to the offset direction of the first arm 4 with respect to the columnar member 8, by the same amount, and is disposed so as to rotate in a plane including the longitudinal axis of the columnar member 8. Accordingly, the central axis of the second arm 5 is disposed in the same plane as the central axis of the columnar member 8.

The operation of the thus-configured robot 1 of this embodiment will be described below.

In order to use the robot 1 of this embodiment, the support foot member 7 is installed on the floor surface F and is fixed to the floor surface F by using anchor bolts in the through-holes at the four corners of the guard section 7b. Accordingly, the robot 1 can be operated as a floor-surface-installed 6-axis vertical articulated robot.

In this case, in the robot 1 of this embodiment, the base 2 is constituted of the flat support foot member 7 and the column-shaped columnar member 8, which extends vertically upward from the center thereof, the length of the columnar member 8 is longer than the first arm 4, and the thickness thereof is the same as the first arm 4; thus, there is an advantage in that the robot 1 is formed to be lightweight and slim, does not occupy a large space, and can ensure a large worker workspace.

Figure 3:
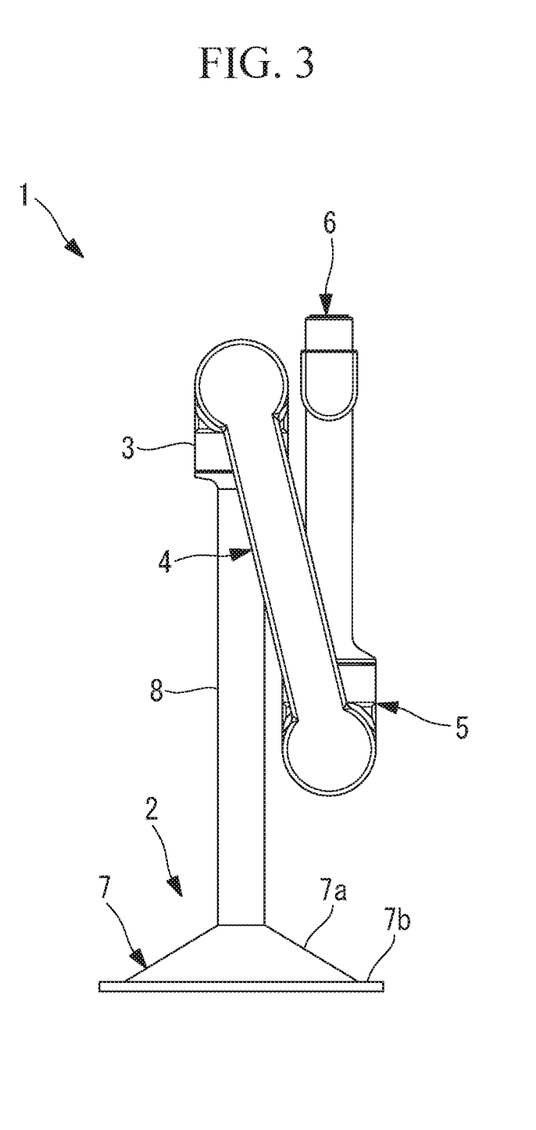
FIG. 3 is a side view showing the attitude of the robot shown in FIG. 1 in a folded state.

Furthermore, the turning part 3 is disposed at the upper end of the elongated columnar member 8, and the columnar member 8 is formed to be longer than the first arm 4, thereby making it possible to realize not only an operating state in which the first arm 4 is disposed above the second axis B, as shown in FIG. 1, but also an operating state in which the first arm 4 is disposed below the second axis B, as shown in FIG. 3, which is the same operating state as in a ceiling-suspended-type robot.

Figure 4:
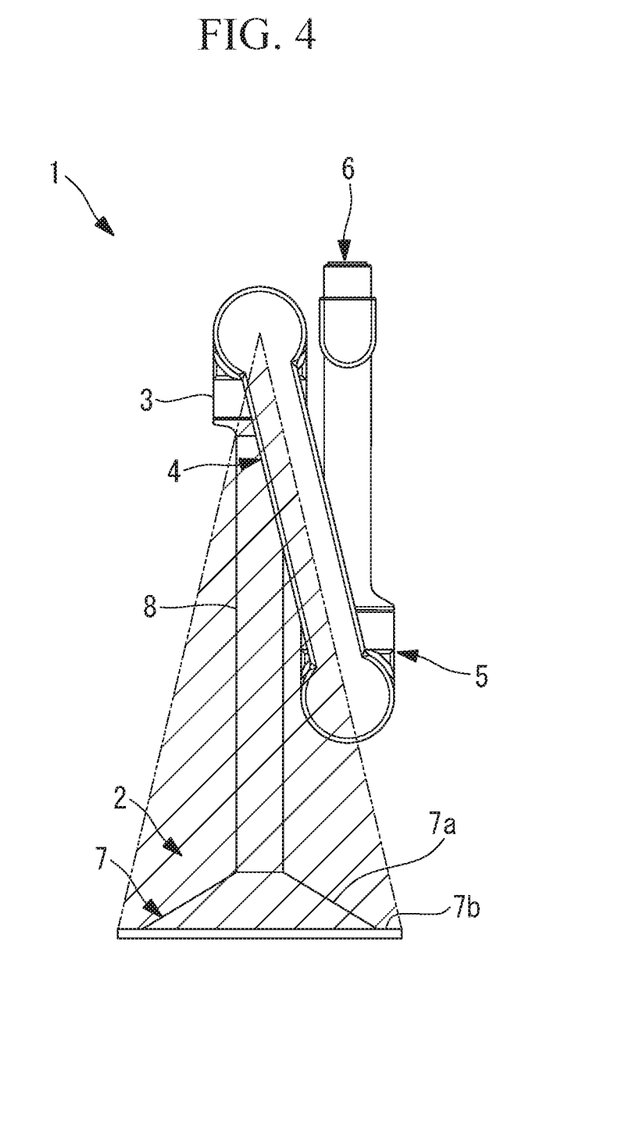
FIG. 4 is a side view for explaining the position of the center of gravity in the attitude shown in FIG. 3.

Then, when the robot 1 is conveyed, as shown in FIG. 3, the first arm 4 and the second arm 5 are folded so as to make the second arm 5 parallel to the columnar member 8, thereby making it possible to dispose the center of gravity of the entire robot 1 at a low position and to make it difficult for the robot 1 to fall over. In this state, as shown in FIG. 4, the position of the center of gravity of the entire robot 1 is disposed in a pyramid-shaped space (in the figure, hatched region) in which the support foot member 7 serves as the bottom, and the intersection point of a vertical line passing though the center of the support foot member 7 and a plane including the second axis B serves as a vertex. Accordingly, even when the robot 1 leans to some extent, the center of gravity thereof is maintained so as not to be disposed outside the support foot member 7, thus making it possible to make it difficult for the robot 1 to fall over.

Specifically, in a case in which a worker places the robot 1 detached from the floor surface F on a dolly (not shown) or the like or does not place the robot 1 on a dolly or the like, and applies a horizontal external force to a side surface of the robot 1 to push it, thereby moving the robot 1 in the direction in which the external force has been applied, because the center of gravity of the entire robot 1 is disposed in the above-described pyramid-shaped space, it is possible to prevent a fall during the movement.

In this way, according to the robot 1 of this embodiment, because the turning part 3 is attached on the columnar member 8, which has a length equal to or longer than the length of the first arm 4 and has a thickness equal to the thickness of the first arm 4, there is an advantage in that, while allowing the robot 1 to be installed on the floor surface F, a large human workspace can be ensured as in a ceiling-suspended-type robot. Furthermore, because the position of the center of gravity of the entire robot in a state in which the first arm 4 and the second arm 5 are folded is disposed in the pyramid-shaped space in which the support foot member 7 serves as the bottom, and the intersection point of a vertical line passing though the center of the support foot member 7 and a plane including the second axis B serves as a vertex, there is an advantage in that the robot 1 is unlikely to fall over even when the robot 1 is pushed from the side and is inclined during relocation, thus making it possible to improve the ease of relocation.

Figure 5:
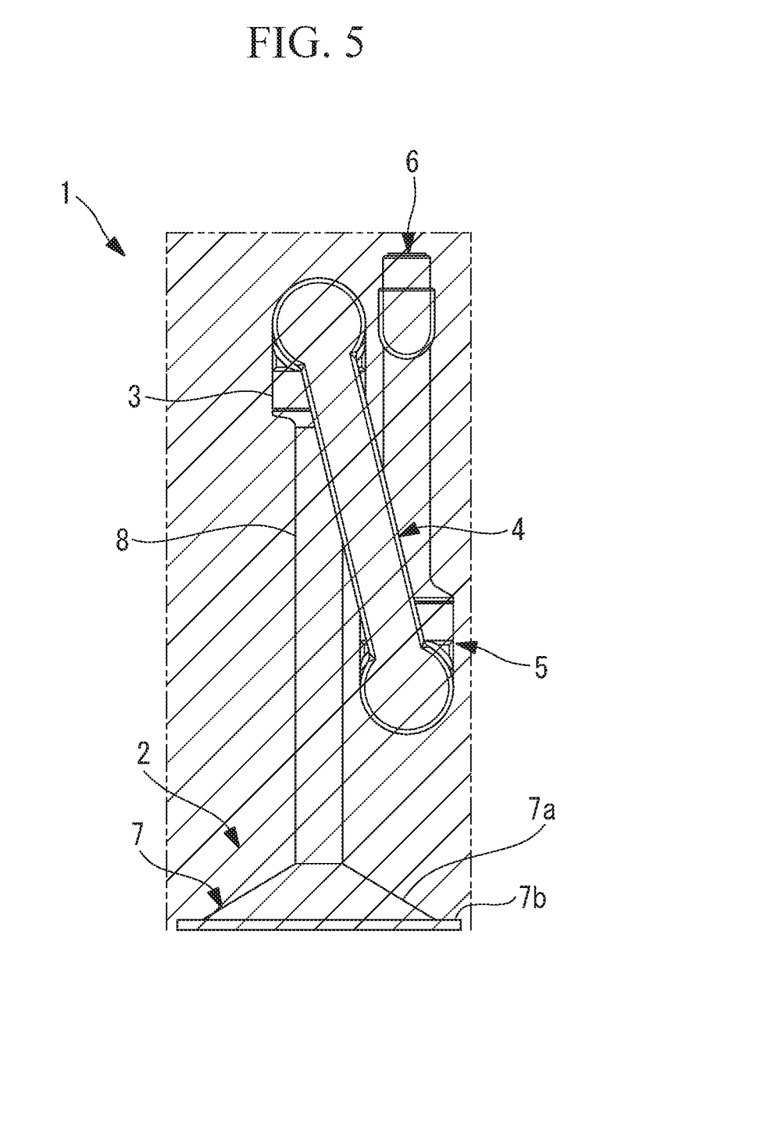
FIG. 5 is a side view for explaining a space occupied by the robot in the attitude shown in FIG. 3.

Furthermore, according to the robot 1 of this embodiment, there is an advantage in that, when the first arm 4 and the second arm 5 are folded, as shown in FIG. 5, the entire robot 1 can be accommodated in a columnar space in which the support foot member 7 serves as a bottom (in the figure, hatched region), and effective use of a space can be achieved when many robots are stored or conveyed side by side.

Note that, in this embodiment, the columnar member 8 of the base 2 may have a vertically extendable structure. By doing so, there is an advantage in that such a motion range that allows the robot to reach a higher position can be set by extending the columnar member 8, and the center of gravity when the arms are folded can be set at a lower position by contracting the columnar member 8.

Furthermore, extension and contraction of the columnar member 8 may be extension and contraction performed by a servo drive or may be extension and contraction, not performed by a drive shaft of the robot 1, but performed through manual operation or electrical operation.

Furthermore, in this embodiment, although the floor surface F is shown as an example of the installation target surface on which the support foot member 7 is fixed, the present invention is not limited thereto, and the support foot member 7 may be fixedly installed on another arbitrary installation target surface, for example, an upper surface of a support stage installed on the floor surface F.

Furthermore, although a description has been given of a case in which the shape of the support foot member 7 is substantially square in plan view, the present invention is not limited thereto, and the support foot member 7 may have another arbitrary shape.

Furthermore, in this embodiment, a description has been given of the 6-axis vertical articulated robot, which has: the turning part 3 rotatable about the vertical axis A, above the base 2; the first arm 4 pivotable about the first horizontal axis B, on the turning part 3; the second arm 5 pivotable about the second horizontal axis C, at the distal end of the first arm 4; and the 3-axis wrist 6 disposed at the distal end of the second arm 5. Instead of this, however, it is also possible to adopt a robot having another arbitrary axis configuration. Furthermore, in FIG. 1, the first arm 4 may be an arm that is moved away from the turning part 3 and that has a large offset amount with respect to the first axis A, or an arm in which the second axis B is offset toward the wrist 6 with respect to the first axis A.

As a result, the above-described embodiment leads to the following aspect.

One aspect of the present invention is directed to a robot including: a base that is provided with a flat installation surface member that is installed on an installation target surface and a columnar member that extends upward from the installation surface member; and a first arm, one end of which is supported so as to be rotatable about a first horizontal axis located above the columnar member of the base and that has a motion range below the first horizontal axis, wherein the columnar member has a length that is equal to or longer than the length of the first arm and has a uniform transverse sectional area that is the same as the first arm.

According to this aspect, the flat installation surface member of the base is installed on the installation target surface, and the first arm is made to pivot about the first horizontal axis located above the columnar member, thereby making it possible to cause the distal end of the first arm to move in the motion range located below the first horizontal axis. Because the installation surface member, which is installed on the installation target surface, is flat and is disposed so as to spread along the installation target surface, and the columnar member has a uniform transverse sectional area that is the same as the first arm, the robot is formed to be lightweight and slim, does not occupy a large space, and thus does not disturb human work. Accordingly, while allowing the robot to be installed on the installation target surface, such as a floor surface, it is possible to ensure a large human workspace, as in a ceiling-suspended-type robot.

Furthermore, in the above-described aspect, the columnar member may be extendable in the vertical direction.

By doing so, such a motion range that allows the robot to reach a higher position can be set by extending the columnar member, and the center of gravity when the arms are folded can be set at a lower position by contracting the columnar member.

In the above-described aspect, a turning part that is provided on top of the columnar member so as to be rotatable about a vertical axis may be provided; the one end of the first arm may be attached to the turning part so as to be rotatable about the first horizontal axis; and a second arm that is attached to the other end of the first arm so as to be rotatable about a second horizontal axis parallel to the first horizontal axis may be provided.

By doing so, the turning part, which is disposed on the upper end of the columnar member, is rotated about the vertical axis, the first arm, one end of which is attached to the turning part, is made to pivot about the first horizontal axis, and the second arm, one end of which is attached to the other end of the first arm, is made to pivot about the second horizontal axis, thereby making it possible to arbitrarily change the three-dimensional position of the distal end of the second arm.

Furthermore, in the above-described aspect, the robot may have a form such that the center of gravity of the entire robot in a state in which the first arm and the second arm are folded can be disposed in a pyramid-shaped space in which an installation surface of the base serves as the bottom, and the intersection point of a vertical line passing through the center of the installation surface and a horizontal plane including the first horizontal axis serves as a vertex.

By doing so, when the robot is conveyed, the first arm and the second arm are folded, thereby making it possible to dispose the position of the center of gravity of the entire robot in a pyramid-shaped space in which the installation surface of the base serves as the bottom, and the intersection point of a vertical line passing through the center of the installation surface and a horizontal plane including the first horizontal axis serves as a vertex. Therefore, when the robot is conveyed after the base is separated from the installation target surface, it is possible to stably convey the robot while the center of gravity thereof is being disposed at a lower position and to maintain the center of gravity thereof at an inner side of the base even when the robot leans during the conveying, thus making it possible to make it difficult for the robot to fall over.

Furthermore, in the above-described aspect, the first arm and the second arm may be able to be folded into a form accommodated in a columnar space that extends in the vertical direction, with the installation surface of the base serving as a bottom.

By doing so, when conveyed, a plurality of robots can be disposed in a dense manner such that the bases are brought into close contact with each other, thus making it possible to improve conveyance efficiency.

According to the present invention, an advantageous effect is afforded in that, while allowing the robot to be installed on an installation target surface, such as a floor surface, it is possible to ensure a large human workspace, as in a ceiling-suspended type robot.

REFERENCE SIGNS LIST 1 robot
2 base
3 turning part
4 first arm
5 second arm
7 support foot member (installation surface member)
8 columnar member
A first axis (vertical axis)
B second axis (first horizontal axis)
C third axis (second horizontal axis)
F floor surface (installation target surface)

The invention claimed is:
1. A robot comprising:
a base having a flat installation surface member that is installed on an installation target surface and an elongated columnar member that extends upward from the installation surface member;
a turning part that is provided on top of the elongated columnar member so as to be rotatable about a vertical axis;
a first arm, one end of which is attached to the turning part so as to be rotatable about a first horizontal axis located above the elongated columnar member of the base and that has a motion range below the first horizontal axis, the motion range covering an entire circumference of the elongated columnar member with the vertical axis as a center thereof; and
a second arm that is attached to another end of the first arm so as to be rotatable about a second horizontal axis parallel to the first horizontal axis,
wherein the elongated columnar member has a length that is equal to or longer than a length of the first arm and has a thickness that is a same as a maximum width of a cross section in a section of the first arm between a surrounding portion of the first horizontal axis and a surrounding portion of the second horizontal axis, such that in a folded state the robot is configured to fold the first arm and the second arm such that the first arm and the columnar member fall inside a conical space in which an installation surface of the base serves as the bottom, and an intersection point of a vertical line passing through a center of the installation surface and a horizontal plane including the first horizontal axis serves as a vertex, and wherein a position of a center of gravity of the robot is disposed in the conical space, and wherein the first arm is located along a side of the conical space when viewed along the first horizontal axis, wherein the conical space is bounded by the first arm.

2. The robot according to claim 1, wherein the elongated columnar member is extendable in a vertical direction.

3. The robot according to claim 1, wherein the first arm and the second arm can be folded into a form accommodated in a columnar space that extends in a vertical direction, with the installation surface of the base serving as the bottom.

4. The robot according to claim 1, wherein the flat installation surface member comprises a truncated cone section that extends upward at the center portion of the flat installation surface member, and a flat plate guard section that extends horizontally at an outer periphery of the truncated cone section.

5. The robot according to claim 1, wherein the elongated columnar member has a length that is equal to or longer than a length of the first arm and has a thickness that is a same as a maximum width of a cross section in a section of the first arm between a surrounding portion of the first horizontal axis and a surrounding portion of the second horizontal axis.

6. The robot according to claim 1, wherein a maximum width of a cross section of the elongated columnar member is smaller than a maximum width of a cross section of the turning part.

7. A robot comprising:
a base that is provided with a flat installation surface member that is installed on an installation target surface and an elongated columnar member that extends upward from the installation surface member;
a turning part that is provided on top of the elongated columnar member so as to be rotatable about a vertical axis;
a first arm, one end of which is attached to the turning part so as to be rotatable about a first horizontal axis located above the elongated columnar member of the base and that has a motion range below the first horizontal axis, the motion range covering an entire circumference of the elongated columnar member with the vertical axis as a center thereof;
a second arm that is attached to another end of the first arm so as to be rotatable about a second horizontal axis parallel to the first horizontal axis; and a wrist that is attached to the second arm and that is movable around three axes; and wherein the robot is configured to fold the first arm and the second arm such that the first arm and the columnar member fall inside a conical space in which an installation surface of the base serves as a bottom, and an intersection point of a vertical line passing through a center of the installation surface and a horizontal plane including the first horizontal axis serves as a vertex, and wherein a position of a center of gravity of the robot is disposed in the conical space; and wherein the elongated columnar member has a length that is equal to or longer than a length of the first arm and has a thickness that is a same as a maximum width of a cross section in a section of the first arm between a surrounding portion of the first horizontal axis and a surrounding portion of the second horizontal axis, such that in a folded state the first arm is located along a side of the conical space when viewed along the first horizontal axis, wherein the conical space is bounded by the first arm.

8. The robot according to claim 7, wherein the elongated columnar member is extendable in a vertical direction.

9. The robot according to claim 7, wherein the first arm and the second arm can be folded into a form accommodated in a columnar space that extends in a vertical direction, with the installation surface of the base serving as the bottom.

10. The robot according to claim 7, wherein the flat installation surface member comprises a truncated cone section that extends upward at the center portion of the flat installation surface member, and a flat plate guard section that extends horizontally at an outer periphery of the truncated cone section.

11. The robot according to claim 7, wherein the elongated columnar member has a length that is equal to or longer than a length of the first arm and has a thickness that is a same as a maximum width of a cross section in a section of the first arm between a surrounding portion of the first horizontal axis and a surrounding portion of the second horizontal axis.

12. The robot according to claim 7, wherein a maximum width of a cross section of the elongated columnar member is smaller than a maximum width of a cross section of the turning part.

* * * * *